US012717959B2

(12) United States Patent
Nawathe et al.

(10) Patent No.: US 12,717,959 B2
(45) Date of Patent: Aug. 25, 2026

(54) DATABASE HAVING PROBABILISTIC DATA STRUCTURES

(71) Applicant: Adobe Inc., San Jose, CA (US)

(72) Inventors: Sandeep Anant Nawathe, Sunnyvale, CA (US); Yeshwanth Vijayakumar, Sunnyvale, CA (US); Antonio Cuevas, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 22 days.

(21) Appl. No.: 18/909,584

(22) Filed: Oct. 8, 2024

(65) Prior Publication Data

US 2026/0099623 A1 Apr. 9, 2026

(51) Int. Cl.
*G06F 21/62* (2013.01)
*G06F 16/22* (2019.01)
*G06F 16/248* (2019.01)

(52) U.S. Cl.
CPC ........ *G06F 21/6227* (2013.01); *G06F 16/221* (2019.01); *G06F 16/248* (2019.01)

(58) Field of Classification Search
CPC ... G06F 21/6227; G06F 16/221; G06F 16/248
USPC ........................................................ 726/27
See application file for complete search history.

(56) References Cited

U.S. PATENT DOCUMENTS 8,438,184 B1 * 5/2013 Wang ...................... H04L 67/02 707/780
8,880,880 B2 11/2014 Mao et al.
9,298,934 B1 3/2016 Sang et al.
9,349,132 B2 * 5/2016 Cronin ................ G06F 16/2228
9,471,791 B2 10/2016 Fawaz et al.
10,579,808 B2 3/2020 Baldwin et al.
10,579,831 B2 3/2020 Rubin et al.
10,642,994 B1 5/2020 Allen et al.
10,831,920 B2 11/2020 Luo et al.
10,878,335 B1 12/2020 Waugh
10,943,680 B1 3/2021 Knas et al.
10,963,541 B2 * 3/2021 Cronin ................ G06F 16/2228
10,970,393 B1 4/2021 Stiles
11,720,708 B2 8/2023 Torbey
11,741,068 B2 * 8/2023 Sheppard ............ G06F 16/2246 707/747
11,755,545 B2 * 9/2023 Sheppard ............. H04N 21/254 707/754
11,854,030 B2 * 12/2023 Sheppard ........... G06Q 30/0204
11,983,228 B1 * 5/2024 Swope .................. G06F 16/951
12,314,240 B1 5/2025 Opincariu et al.
(Continued)

OTHER PUBLICATIONS

Graham Cormode, "Sketch Techniques for Approximate Query Processing", 2011.*
(Continued)

*Primary Examiner* — Samson B Lemma
(74) *Attorney, Agent, or Firm* — FIG. 1 Patents

(57) ABSTRACT

Data privacy management techniques using probabilistic data structures are described. In one or more examples, a dataset record is received that includes an identity key, a respective attribute, and confidential information. A sketch is generated as a probabilistic data structure based on the identity key and the attribute. A mapping is formed of the confidential information to the sketch. The sketch is communicated to be stored in a database that supports a probabilistic result to a query operation.

20 Claims, 14 Drawing Sheets

(56) References Cited

U.S. PATENT DOCUMENTS

| | | | | |
|---|---|---|---|---|
| 12,353,586 | B2 | 7/2025 | Langseth et al. | |
| 12,401,835 | B2 * | 8/2025 | Govindarajan | G06F 16/90335 |
| 2014/0278771 | A1 * | 9/2014 | Rehman | G06F 16/2228 705/7.31 |
| 2014/0280153 | A1 * | 9/2014 | Cronin | G06F 16/2228 707/737 |
| 2014/0280193 | A1 * | 9/2014 | Cronin | G06F 16/2228 707/741 |
| 2015/0178769 | A1 | 6/2015 | Mirisola et al. | |
| 2016/0028774 | A1 | 1/2016 | Vahlis et al. | |
| 2017/0359363 | A1 | 12/2017 | Thakurta et al. | |
| 2018/0039619 | A1 | 2/2018 | Thakurta et al. | |
| 2018/0182052 | A1 | 6/2018 | Panagos | |
| 2018/0349636 | A1 | 12/2018 | Bhowmick et al. | |
| 2020/0401726 | A1 | 12/2020 | Lim et al. | |
| 2021/0165786 | A1 | 6/2021 | Halstead et al. | |
| 2021/0248629 | A1 | 8/2021 | Sullivan et al. | |
| 2021/0357403 | A1 * | 11/2021 | Dash | G06F 16/24568 |
| 2021/0359836 | A1 | 11/2021 | Wright et al. | |
| 2022/0012349 | A1 | 1/2022 | Kirkwood et al. | |
| 2022/0036390 | A1 * | 2/2022 | Sheppard | G06Q 30/0204 |
| 2022/0292101 | A1 * | 9/2022 | Mai | G06F 16/24568 |
| 2023/0004997 | A1 * | 1/2023 | Sheppard | G06Q 30/0201 |
| 2023/0052628 | A1 | 2/2023 | Wang et al. | |
| 2023/0421559 | A1 | 12/2023 | Daskon Herath Mudiyanselage et al. | |
| 2024/0005022 | A1 | 1/2024 | Cook et al. | |
| 2024/0045866 | A1 * | 2/2024 | Bordawekar | G06F 16/2237 |
| 2024/0078223 | A1 | 3/2024 | Sheppard et al. | |
| 2024/0104228 | A1 | 3/2024 | Clegg | |
| 2024/0152954 | A1 | 5/2024 | Bramble | |
| 2024/0214385 | A1 | 6/2024 | Wang et al. | |
| 2024/0249019 | A1 | 7/2024 | Nouri et al. | |
| 2024/0281453 | A1 | 8/2024 | Tarmazdi | |
| 2024/0281564 | A1 | 8/2024 | Kairouz et al. | |
| 2024/0364361 | A1 * | 10/2024 | Yan | H03M 7/3088 |
| 2025/0156300 | A1 | 5/2025 | Peng et al. | |
| 2025/0209198 | A1 | 6/2025 | Madan et al. | |
| 2025/0209199 | A1 | 6/2025 | Madan et al. | |
| 2025/0342271 | A1 | 11/2025 | Chen et al. | |
| 2026/0003996 | A1 | 1/2026 | Cesar et al. | |
| 2026/0099622 | A1 | 4/2026 | Nawathe et al. | |
| 2026/0105177 | A1 | 4/2026 | Nawathe et al. | |
| 2026/0134137 | A1 | 5/2026 | Nawathe et al. | |
| 2026/0141288 | A1 | 5/2026 | Nawathe et al. | |
| 2026/0178767 | A1 | 6/2026 | Nawathe et al. | |
| 2026/0178769 | A1 | 6/2026 | Nawathe et al. | |

OTHER PUBLICATIONS

Choi, et al., “Differentially-Private Multi-Party Sketching for Large-Scale Statistics”, sciendo, Proceedings on Privacy Enhancing Technologies, 2020 (3): 153-174, [retrieved from the internet on Feb. 28, 2025], <https://petsymposium.org/popets/2020/popets-2020-0047.pdf>, 2020, 22 pages.

Dickens, et al., “Order-Invariant Cardinality Estimators Are Differentially Private”, Cornell University, arXiv.org, [retrieved from the internet on Feb. 28, 2025], <https://arxiv.org/pdf/2203.15400>, Feb. 3, 2023, 23 pages.

Github, “Differential Privacy”, GitHub, [retrieved from the internet on Feb. 26, 2025], <https://github.com/google/ differential-privacy>, 2025, 7 pages.

Nawathe, et al., “Pursuant to MPEP § 2001.06(b) the applicant brings the following co-pending application to the Examiner’s attention:”, U.S. Appl. No. 19/011,348, filed Jan. 6, 2025, 100 pages.

Nawathe, et al., “Pursuant to MPEP § 2001.06(b) the applicant brings the following co-pending application to the Examiner’s attention:”, U.S. Appl. No. 18/946,686, filed Nov. 13, 2024, 113 pages.

Nawathe, et al., “Pursuant to MPEP § 2001.06(b) the applicant brings the following co-pending application to the Examiner’s attention:”, U.S. Appl. No. 18/952,628, filed Nov. 19, 2024, 109 pages.

Nawathe, et al., “Pursuant to MPEP § 2001.06(b) the applicant brings the following co-pending application to the Examiner’s attention:”, U.S. Appl. No. 18/988,202, filed Dec. 19, 2024, 105 pages.

Nawathe, et al., “Pursuant to MPEP § 2001.06(b) the applicant brings the following co-pending application to the Examiner’s attention:”, U.S. Appl. No. 18/988,635, filed Dec. 19, 2024, 99 pages.

Opendp, “Use Our Tools—OpenDP Library”, [retrieved from the internet on Feb. 26, 2025], <https://opendp.org/tools>, 2025, 5 pages.

Krishnamurthy et al., “Sketch-based Change Detection: Methods, Evaluation, and Applications,” IMC ’03: Proceedings of the 3rd ACM SIGCOMM conference on Internet measurement, Oct. 27, 2003, 14 pages.

Non-Final Office Action issued in U.S. Appl. No. 19/011,348, mailed Nov. 21, 2025, 28 pages.

Ueda et al., “Change Detection with Probabilistic Models on Persistence Diagrams,” 2022 IEEE International Conference on Data Mining (ICDM), Nov. 28, 2022, pp. 1191-1196.

Dalvi, Nilesh , et al., “Queries and Materialized Views on Probabilistic Databases”, Journal of Computer and System Sciences, 77, 2011, pp. 473-490.

Ido, Shota , et al., “Pursuant to MPEP § 2001.06(b) the applicant brings the following co-pending application to the Examiner’s attention:”, U.S. Appl. No. 18/672,990, filed May 23, 2024, 68 pages.

MIT , “MIT Probabilistic Computing Project”, [retrieved from the internet on Nov. 24, 2024], <http://probcomp.csail.mit.edu/software/bayesdb/>, 2024, 3 pages.

Nawathe, Sandeep Anant, et al., “Pursuant to MPEP § 2001.06(b) the applicant brings the following co-pending application to the Examiner’s attention:”, U.S. Appl. No. 18/909,530, filed Oct. 8, 2024, 64 pages.

Nawathe, Sandeep Anant, et al., “Pursuant to MPEP § 2001.06(b) the applicant brings the following co-pending application to the Examiner’s attention:”, U.S. Appl. No. 18/912,872, filed Oct. 11, 2024, 87 pages.

Non-Final Office Action issued in U.S. Appl. No. 18/912,872, mailed May 11, 2026, 13 pages.

Non-Final Office Action issued in U.S. Appl. No. 18/946,686, mailed Apr. 9, 2026, 32 pages.

Non-Final Office Action issued in U.S. Appl. No. 18/988,202, mailed Jun. 17, 2026, 18 pages.

Non-Final Office Action issued in U.S. Appl. No. 18/988,635, mailed May 11, 2026, 34 pages.

Restriction Requirement issued in U.S. Appl. No. 18/909,530, mailed May 5, 2026, 7 pages.

1 Final Office Action issued in U.S. Appl. No. 19/011,348, mailed Feb. 26, 2026, 17 pages.

* cited by examiner

100
Service Provider System 102
Digital Service Manager Module 108
Digital Services 112
Hardware and Software Resources 110
Database Service 116
118
Database 120
Sketch 136
Probabilistic Data Structure 138
140
Network 106
Computing Device 104
Communication Manager Module 114
Dataset Manager Module 122
Privacy Manager Module 134
126
Dataset 124
Dataset Record 128
Confidential Information 130
Attribute 132

Dataset 124

| HashedEmail[] | ipAddress[] | Audienceid[] |
|---|---|---|
| E1, E2 | ip1, ip2 | a1, a2, a3 |
| E3 | ip3 | a1 |
| E4 | | a3 |

Mapping 212

| Sketch | Membership IDs |
|---|---|
| Hashedemail-a1 | E1, E2, E3 |
| Hashedemail-a2 | E1, E2 |
| Hashedemail-a3 | E1, E2, E4 |
| ipAddress-a1 | ip1, ip2, ip3 |
| ipAddress-a2 | ip1, ip2 |
| ipAddress-a3 | ip1, ip2 |

400

Dataset Manager Module 122

| Data Type | Sketch Family Generated |
|---|---|
| Categorical | Membership querying, Cardinality Estimators, Similarity Checks |
| Categorical Number | Membership querying, Cardinality Estimators, Similarity Checks |
| Continuous Valued | Membership querying, Cardinality Estimators, Similarity Checks, Frequency Estimators, Rank Estimators |

Dataset Manager Module 122

| Hashed Email | age | gender | preferences[] |
|---|---|---|---|
| E1 | 35 | M | shoes, belts |
| E2 | 24 | F | |
| E3 | 40 | NA | |
| E4 | 22 | F | |

Fig. 5

602
Receive a dataset record

604
Filter confidential information from the dataset record

606
Generate a sketch as a probabilistic data structure

608
Form a mapping of the confidential information with the sketch

610
Communicate the sketch to be stored in a database that supports a probabilistic response to a query operation, the sketch configured to be stored independent of the confidential information

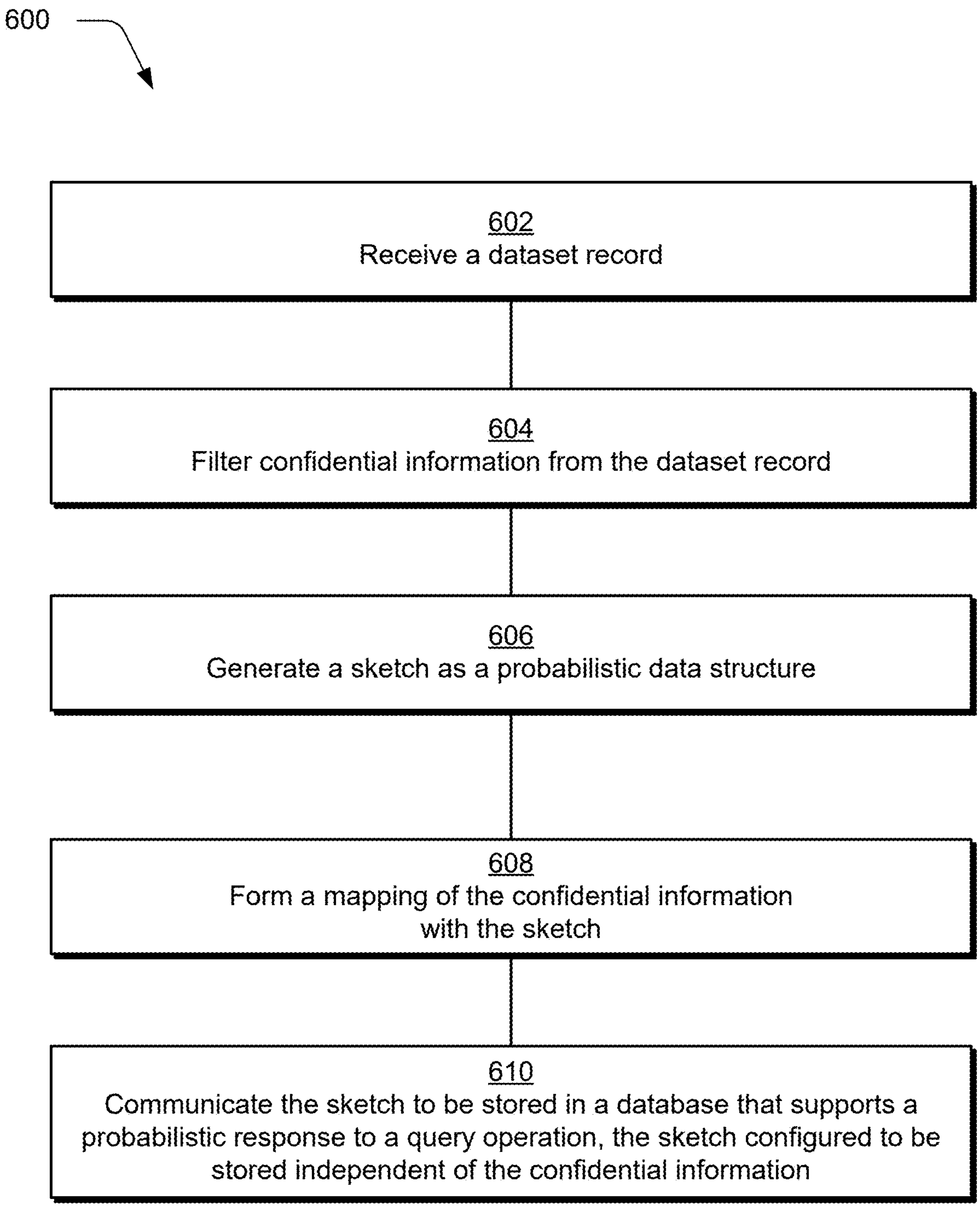

Fig. 6

1002
Receive a query for processing by a database

1004
Generate a probabilistic result by processing the query using the database based on a corresponding operation, the database including a plurality of sketches, each sketch configured as a probabilistic data structure having a column that maintains a respective designated value associated with a respective entity of a plurality of entities 1006
Present the probabilistic result for output in a user interface

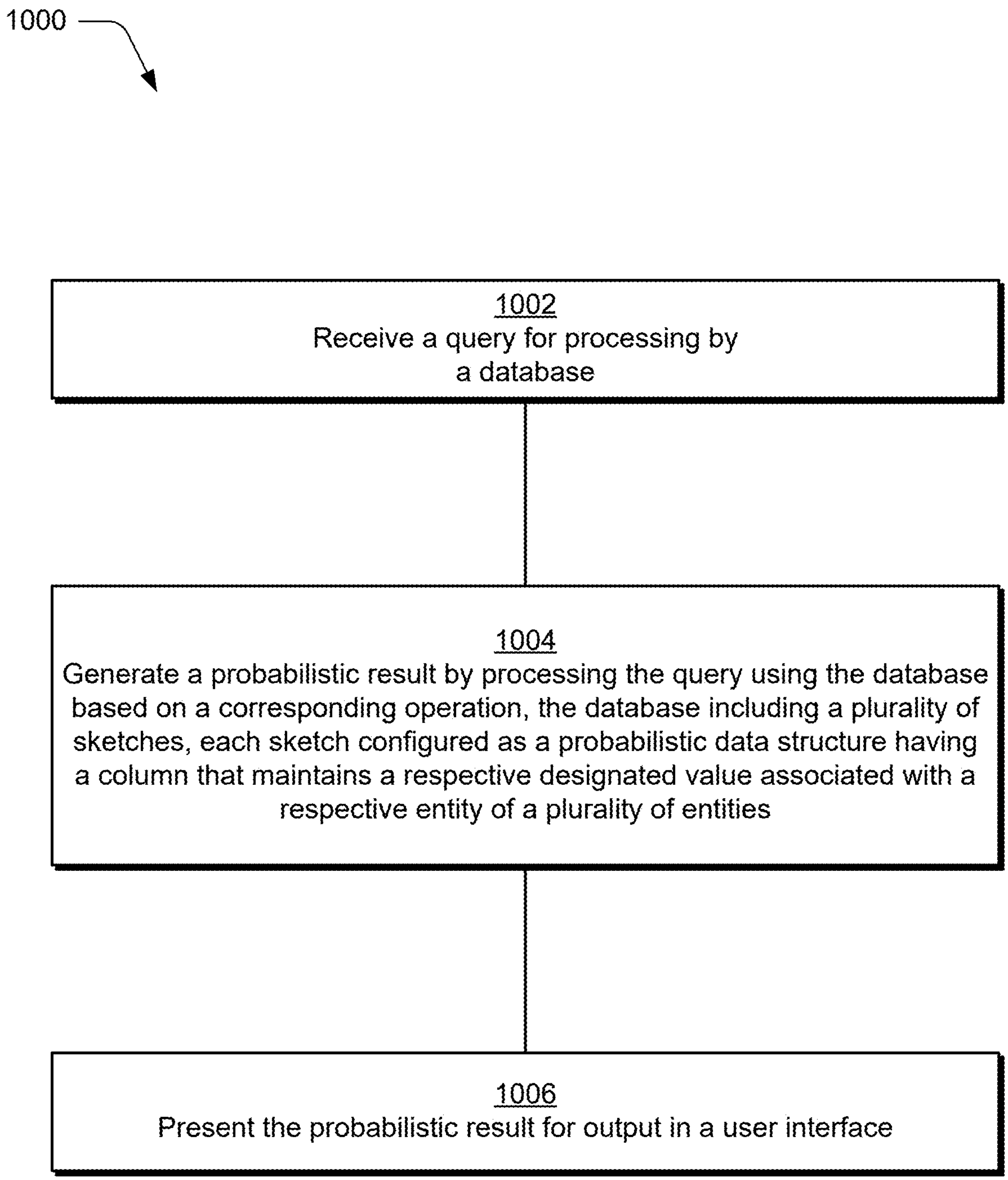

Fig. 10

1102
Receive a structured dataset including dataset records that include a respective identity key of a plurality of identity keys and a respective designated value associated with respective entities of a plurality of entities 1104
Form a plurality of dataset groups by grouping the dataset records based on correspondence with respective entities of the plurality of entities 1106
Generate a plurality of sketches, respectively, based on the plurality of dataset groups, each sketch configured as a probabilistic data structure having a column the maintains the respective designated value associated with the respective entities 1108
Store the plurality of sketches in a database that supports a probabilistic response to a query operation

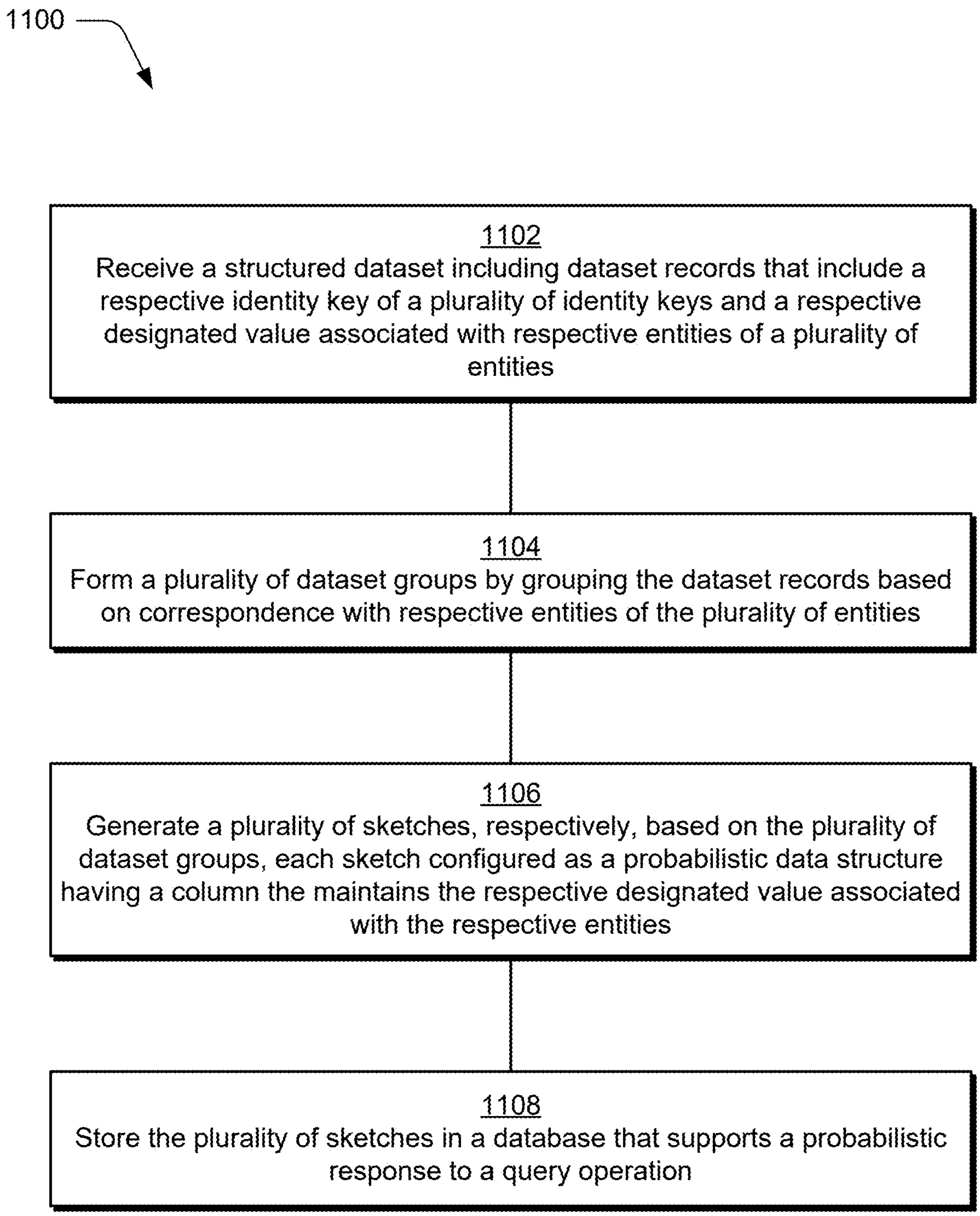

1302
Receive a structured dataset having confidential information, the confidential information included in a plurality of dataset records that correspond, respectively, to a plurality of audiences 1304
Form a plurality of dataset groups by grouping the dataset records based on correspondence with respective audiences of the plurality of audiences 1306
Generate a plurality of sketches, respectively, based on the plurality of dataset groups, each sketch configured as a probabilistic data structure that does not include the confidential information 1308
Store a mapping of the confidential information that cross references the plurality the plurality of sketches with the plurality of audiences 1310
Communicate the plurality of sketches to be stored in a database that supports a probabilistic result to a query operation without exposing the plurality of audiences

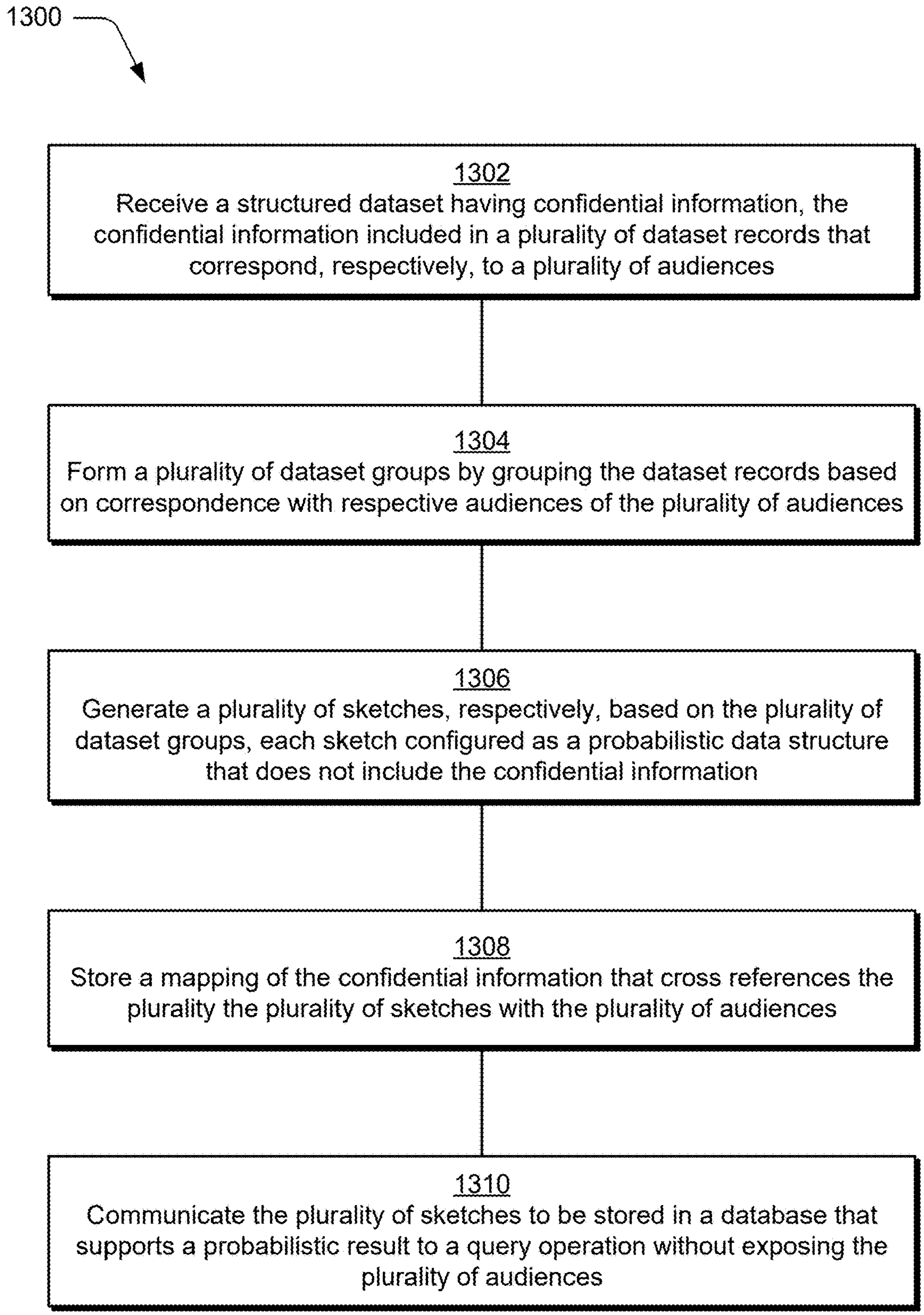

Fig. 13

DATABASE HAVING PROBABILISTIC DATA STRUCTURES

BACKGROUND

Confidential information of users is under constant attack by malicious parties that attempt to expose and exploit this potentially valuable information. Confidential information, for instance, may include personally identifiable information used to identify a user, itself, involve access to accounts associated with the user, and so forth. Data breaches have become common in which confidential information is exposed of millions and even billions of users due to hacking from these malicious parties. Because of this, users are less willing to share this information and are concerned with how this information is used even by legitimate service provider systems.

Techniques have been developed to address this unwillingness that limit user tracking, reject use of "cookies," and so forth. As a result, computational functionality that relies on this data may fail for its intended purpose. This failure results in inaccuracies caused by incomplete data, causes inefficient use of computational resources that are implemented to overcome these technical challenges, and so forth.

SUMMARY

Data privacy management techniques are described herein that are configurable to leverage a probabilistic data structure as a privacy-safe, efficient, and scalable technique in support of data collaboration and query execution. To do so, probabilistic data structures and a database having probabilistic data structures are employed that do not include confidential information while maintaining data associated with the confidential information through the use of a "sketch." A sketch employs a probabilistic data structure that is used to represent data in a condensed form. Sketches, for instance, employ algorithms that support data representation as a probabilistic data structure without storing row-level information containing the confidential information. Thus, by storing a sketch independent of row-level data, recovery of a corresponding user or other entity associated with the data is not possible.

Sketches are also configurable to represent data in a highly condensed form, thereby reducing an amount of data that is stored and processed. Additionally, the condensed nature of sketches enables efficient multi-cloud, multi-region implementation as well as multiparty collaboration. Therefore, seamless data sharing and query execution is supported across different platforms and regions.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 depicts a table in an example implementation showing types of sketches generated for respective data types by a dataset manager module.

FIG. 5 depicts an example implementation of sketch generation methodology employed by a dataset manager module.

FIG. 6 is a flow diagram depicting an algorithm as a step-by-step procedure in an example implementation of operations performable for accomplishing a result of data privacy management utilizing sketch generation and mapping formation.

FIG. 10 is a flow diagram depicting an algorithm as a step-by-step procedure in an example implementation of operations performable for accomplishing a result of query processing using a database having probabilistic data structures.

FIG. 11 is a flow diagram depicting an algorithm as a step-by-step procedure in an example implementation of operations performable for accomplishing a result of sketch generation based on groupings of dataset records.

FIG. 13 is a flow diagram depicting an algorithm as a step-by-step procedure in an example implementation of operations performable for accomplishing a result of sketch generation based on dataset groups formed for respective audiences of users.

DETAILED DESCRIPTION

Overview

Figure 1:
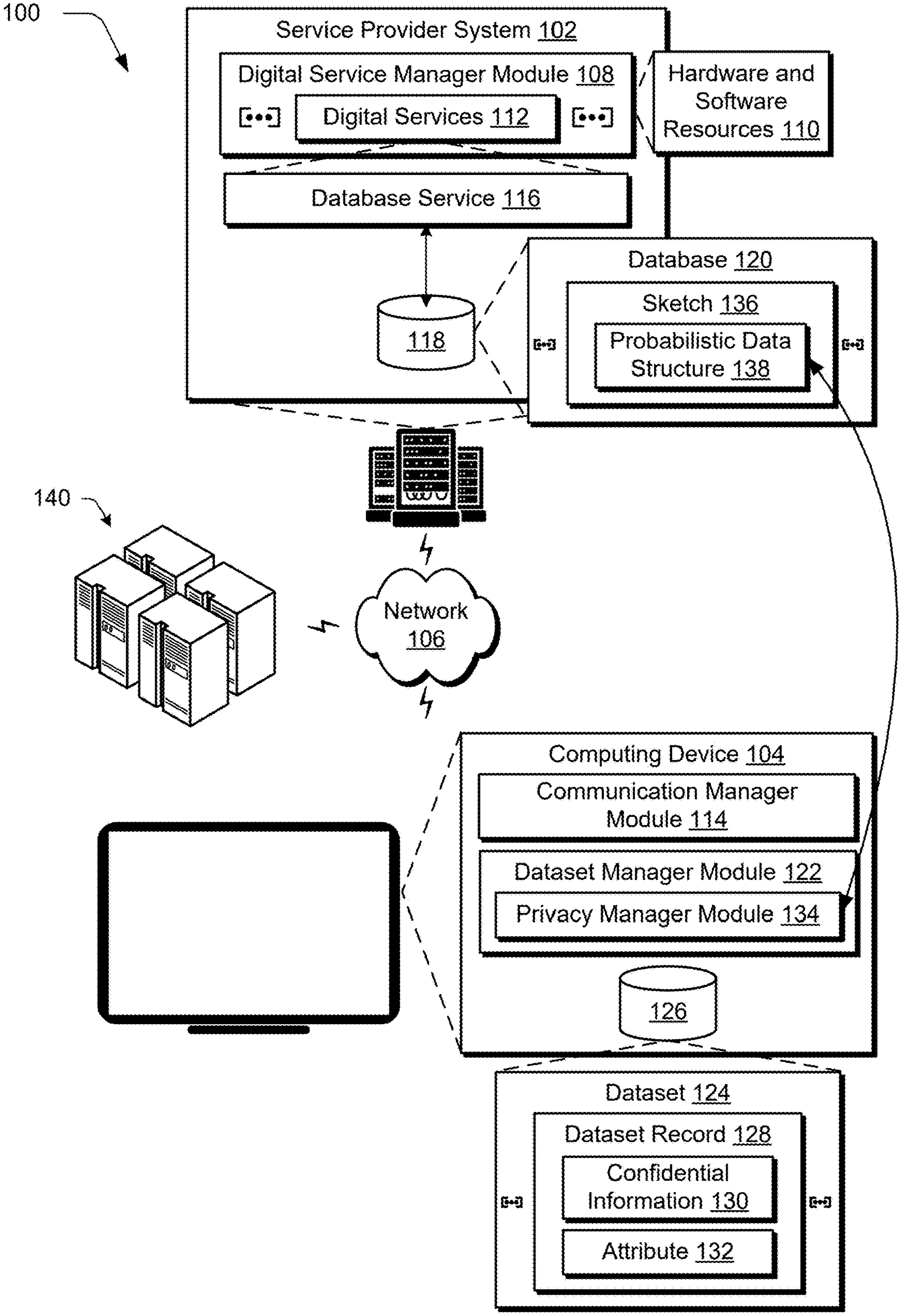
FIG. 1 is an illustration of a digital medium environment in an example implementation that is operable to employ data privacy management techniques described herein as implemented using a probabilistic data structure.

Confidential information refers to a variety of information types, including information usable to identify a user also known as "personally identifiable information," identify membership in particular audiences, potentially sensitive information (e.g., medical information), and so forth.

Examples of personally identifiable information, for instance, include a full legal name, nickname, birthday, social security number, passport number, email address, phone number, home address, financial information, and even biometric data such as facial recognition data, retinal scans, fingerprints, and so forth. Additional examples include membership in a particular audience.

As previously described, data breaches caused by malicious parties have resulted in the compromise of millions and even billions of instances of confidential information. In order to protect this information, privacy regulations and other privacy related considerations have been enacted to limit what user data is available for collection. These considerations have been addressed in a variety of ways through local privacy settings of a respective computing device, cookie-related changes in which browsers block cookie storage, and so forth.

Selection of an option "do not track," for instance, restricts collection of navigation data of a user between websites, applications, and so forth. Likewise, removal of support for third-party cookies by browsers also limits an ability of a provider of the cookie to gain valuable user insight usable to track user navigation through pages of a website, navigation between websites, and so forth. Consequently, computational functionality that is configured to leverage this insight often fails and is inaccurate, e.g., recommendation engines, digital content output control functionality, search engines, and so forth.

Accordingly, data privacy management techniques are described herein that address these and other technical challenges in maintaining and sharing data that may contain confidential information. The data privacy management techniques, for instance, are configurable to leverage a probabilistic data structure as a privacy-safe, efficient, and scalable technique in support of data collaboration and query execution. As a result, these privacy-management techniques leverage use of a database having probabilistic data structures and data collaboration systems to ensure privacy regulation compliance as well as adapt to an ever-changing landscape in how user insight is gained.

To do so, probabilistic data structures and a database having probabilistic data structures are employed that do not include confidential information while maintaining data associated with the confidential information through the use of a "sketch." A sketch employs a probabilistic data structure that is used to represent data in a condensed form. Sketches, for instance, employ algorithms (e.g., a Bloom filter, a Theta Sketch, or a MinHash), that support data representation without storing row-level information containing the confidential information, which ensures privacy by eliminating use of user identities, user audiences, or other confidential information. By storing a sketch independent of row-level data, recovery of a corresponding user, entity, or other confidential information associated with the data is not possible. Thus, a database having probabilistic data structures (e.g., the sketch) does not support direct identification of the confidential information. As a result, these techniques support compliance with privacy regulations and eliminate a risk of data leakage.

Sketches are also configurable to represent data in a highly condensed form, thereby reducing an amount of data that is stored and processed. This efficiency supports faster query execution and efficient use of computational resources. Conventional queries that could take days to process by a computing device (e.g., set operations), for instance, are performable in real time using the techniques described herein.

Additionally, the condensed nature of sketches enables efficient multi-cloud, multi-region implementation as well as multiparty collaboration. Therefore, seamless data sharing and query execution is supported across different platforms and regions. In this way, use of sketches as probabilistic data structures as well as databases having probabilistic data structures support a robust and scalable solution to the technical challenges involved with confidential information. Further discussion of these and other examples is included in the following sections and shown in corresponding figures.

Term Examples

A "probabilistic data structure" is a specialized data structure that is configurable to provide probabilistic responses to a query. A probabilistic data structure, for instance, is configurable to define a probability distribution over possible database instances, e.g., possible worlds.

A "Bloom Filter" is an example of a probabilistic data structure that is configurable to test when an element is or is not a member of a set.

A "MinHash" is an example of a probabilistic data structure that is configured to estimate similarity between two or more sets. MinHash works by hashing each element in a set using one or more hash functions. For each hash function, a minimum hash value is selected. Similarity between the set is estimated by comparing the selected minimum hash values.

A "count-min sketch" is an example of a probabilistic data structure that is configurable to estimate a frequency of elements in a dataset.

A "HyperLogLog" is an example of a probabilistic data structure usable to estimate a number of distinct elements in a data set.

A "Theta Sketch" is an example of a probabilistic data structure that is usable for approximate distinct counting and set operation. Theta sketches support set operations such as union, intersection, and set difference.

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Data Privacy Management Environment

FIG. 1 is an illustration of a digital medium environment 100 in an example implementation that is operable to employ data privacy management techniques described herein as implemented using a probabilistic data structure to control confidential information access. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" for the service provider system 102 and as further described in relation to FIG. 14.

The service provider system 102 includes a digital service manager module 108 that is implemented using hardware and software resources 110 (e.g., a processing device and computer-readable storage medium) in support one or more digital services 112. Digital services 112 are made available, remotely, via the network 106 to computing devices, e.g., computing device 104.

Digital services 112 are scalable through implementation by the hardware and software resources 110 and support a variety of functionalities, including accessibility, verification, real-time processing, analytics, load balancing, data storage, and so forth. Examples of digital services include a social media service, streaming service, digital content repository service, database service, content collaboration service, and so on. Accordingly, a communication manager module 114 (e.g., network-enabled application) is utilized by the computing device 104 to access the one or more digital services 112 via the network 106. A result of processing using the digital services 112 is then returned to the computing device 104 via the network 106.

In the illustrated example, the digital services 112 are utilized to implement a database service 116. The database service 116 is illustrated in this example as accessing a storage device 118 that maintains a database having probabilistic data structures 120. The computing device 104 is illustrated as including a dataset manager module 122 that is configured to manage exposure of a dataset 124 (e.g., also illustrated as stored in a storage device 126) to the database service 116.

The dataset 124, for instance, is formed using a plurality of dataset records, an example of which is depicted as dataset record 128. The dataset record 128 in this example includes confidential information 130 and an attribute 132. The dataset record 128, for instance, is associated with an item of digital content (e.g., an email, webpage, etc.) as an identity key (e.g., a column header) and the attribute 132 indicates whether a particular user interacted with the digital content, e.g., as row-level data. The confidential information 130 in this example is a membership identifier (ID) that identifies a particular entity (e.g., user) associated with the attribute 132 as row-level data for the respective identity key.

As previously described, hackers and other malicious parties continually attempt to expose the confidential information 130, e.g., the identification of the membership ID of a particular user in this example. To address these and other technical challenges such as "do not track" functionality and privacy blocking, the dataset manager module 122 employs a privacy manager module 134. The privacy manager module 134 is configured to maintain the confidential information 130 locally by the computing device 104 yet permit sharing of other parts of the dataset record 128 in support of a variety of functionalities, e.g., recommendation engines and so forth.

To do so, the privacy manager module 134 is configurable to form a sketch 136 having a probabilistic data structure 138. The probabilistic data structure 138 is configured to eliminate use of row-level data of the dataset record 128 through use of algorithms such as Bloom filters, MinHash, Theta Sketches, and so forth. This approach eliminates use of row-level information, which is the confidential information 130 in this example.

The probabilistic data structure 138 is configurable to represent the dataset record 128 in a reduced manner by condensing the dataset record 128 into a compact form by elimination of the row-level information. Elimination of row-level information thus significantly reduces an amount of data that is stored and processed, e.g., by the database service 116. For example, one hundred million rows of data on audiences may be condensed into approximately ten kilobytes of data through use of the probabilistic data structure 138 by the sketch 136.

In this way, the compact representation of the probabilistic data structure 138 by the sketch 136 enables efficient multi-cloud, multi-region, and multi-party collaboration, as the smaller data size allows for seamless data sharing and query execution across different platforms and regions. Additionally, the condensed data representation of the probabilistic data structure 138 allows for faster query execution, significantly improving processing speed when compared to conventional database techniques.

In a multi-collaboration scenario, the privacy manager module 134 of the dataset manager module 122 shares a sketch 136 having a probabilistic data structure 138 that is independent of the confidential information 130. An additional computing device 140 may perform similar operations, such that each of the computing devices 104, 140 are able to share data (e.g., attributes and identity keys associated with the confidential information 130) without exposing the confidential information 130. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Data Privacy Management

The following discussion describes data privacy management techniques that are implementable utilizing the described systems and devices through use of a probabilistic data structure. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

FIG. 6 is a flow diagram depicting an algorithm 600 as a step-by-step procedure in an example implementation of operations performable for accomplishing a result of data privacy management utilizing sketch generation and mapping formation. In portions of the following discussion, reference is made in parallel to FIG. 6 along with a discussion of corresponding systems.

Figure 2:
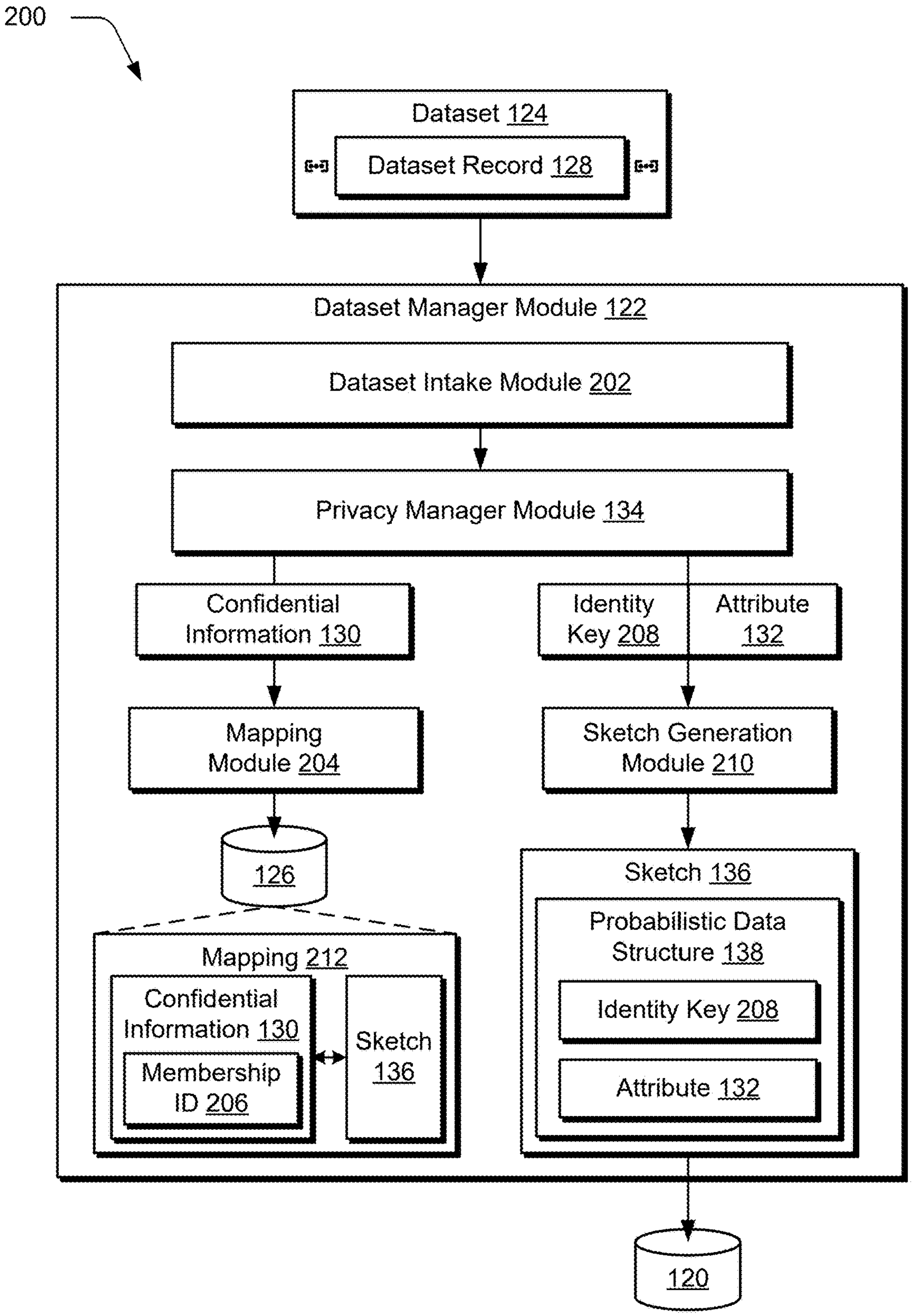
FIG. 2 depicts a system in an example implementation showing operation of a dataset manager module of FIG. 1 in greater detail.

FIG. 2 depicts a system 200 in an example implementation showing operation of the dataset manager module 122 of the computing device 104 of FIG. 1 in greater detail. In this example, a data intake module 202 of the dataset manager module 122 receives a dataset record 128 (block 602), e.g., as part of a dataset 124. The dataset 124 may take a variety of forms, such as a comma separated value (CSV) file or other structure including a table. Other unstructured examples are also contemplated, e.g., in which a structure is then derived through additional processing using machine learning upon intake of the structured data. The data intake module 202 may therefore process the dataset 124 into a form that is compatible with the privacy manager module 134.

The privacy manager module 134 is then employed to filter confidential information 130 from the dataset record 128 (block 604). Each dataset record 128, for instance, includes a column having a corresponding identity key and attributes having data values within the column. The dataset record 128 also includes confidential information 130 associated with the attributes (e.g., as row-level data), e.g., identifying entities associated with the attributes as membership IDs. The membership IDs, for instance, are usable to identify respective user populations.

Accordingly, the privacy manager module 134 is configured in this example to filter the confidential information 130 from the dataset record 128 to form a redacted dataset that does not include the confidential information 130. The confidential information 130 is illustrated as being passed to a mapping module 204. As previously described, the confidential information 130 may take a variety of forms, such as a membership ID 206 as depicted in FIG. 2. An identity key 208 identifying a respective column of the dataset record 128 and associated attribute 132 taken from the dataset record 128 are passed as the redacted dataset by the privacy manager module 134 to a sketch generation module 210. Thus, the sketch generation module 210 in this example does not have access to the confidential information 130 when creating a sketch 136.

The sketch generation module 210 is configured to generate a sketch 136 as a probabilistic data structure 138 (block 606) independent of the confidential information 130. The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques. Further discussion of sketch 136 generation by the sketch generation module 210 is described in relation to FIGS. 3-5 in the following discussion.

The mapping module 204 is configured to form a mapping 212 between the confidential information 130 and the sketch 136 (block 608). The mapping 212 is usable to resolve what confidential information 130 (e.g., the membership ID 206) corresponds with the sketch 136. The mapping 212 is maintained in storage device 126 locally at the computing device 104 and not exposed outside of the computing device 104 in this example, thereby protecting the confidential information 130 from compromise by malicious parties.

The mapping 212 is therefore usable to resolve identification of a particular sketch 136 in a probabilistic result to a query processed by the database service 116 when received at the computing device 104. In this way, the database service 116 does not receive the confidential information 130 and thus is unable to determine an identity of the membership ID 206, thereby preserving privacy of a corresponding entity.

The sketch generation module 210 is configurable to leverage internal data structures for different types of data as part of generating the sketch 136. The sketch generation module 210, for instance, is configurable to detect a type of data included in the dataset record 128 to leverage an internal data structure that is selected based on that data type to form one or more sketches 136.

The sketch generation module 210, for example, is configured to identify each column in the dataset 124 (e.g., "i0," "i1," "i2") having an associated identity key 208 (e.g., column header) of the dataset record 128 and associated attribute 132 with a membership ID 206 supplying row-level information. The sketch generation module 210 is configurable to identity a threshold number (e.g., "k") of distinct values based on saliency, i.e., the "most salient" values. The value of the threshold number may be based on a variety of considerations, examples of which include storage and query considerations.

Different data types in this example involve different techniques used by the sketch generation module 210 to form the sketch 136 and thus different internal data structures. For categorical string values, for instance, the sketch generation module 210 identifies the "top k" strings that have a highest amount of cardinality in a subject column, with other string values being grouped together, e.g., as "other." Thus, the sketch generation module 210 detects that the database record 128 involves categorical strings and, responsive to the detecting, identifies a threshold number of the categorical strings based on cardinality. The sketch generation module 210 then forms a number of sketches 136 based on the threshold number of categorical strings. One or more of the categorical strings that are not included in the threshold number are grouped together.

In another example, the sketch generation module 210 detects that the dataset record 128 involves numerical values. In response, the sketch generation module 210 identifies a threshold number of the numerical values that are used to form the sketch 136 or "bucketizes" the numerical values into a "k" number of buckets for inclusion in the sketch 136.

Figure 3:
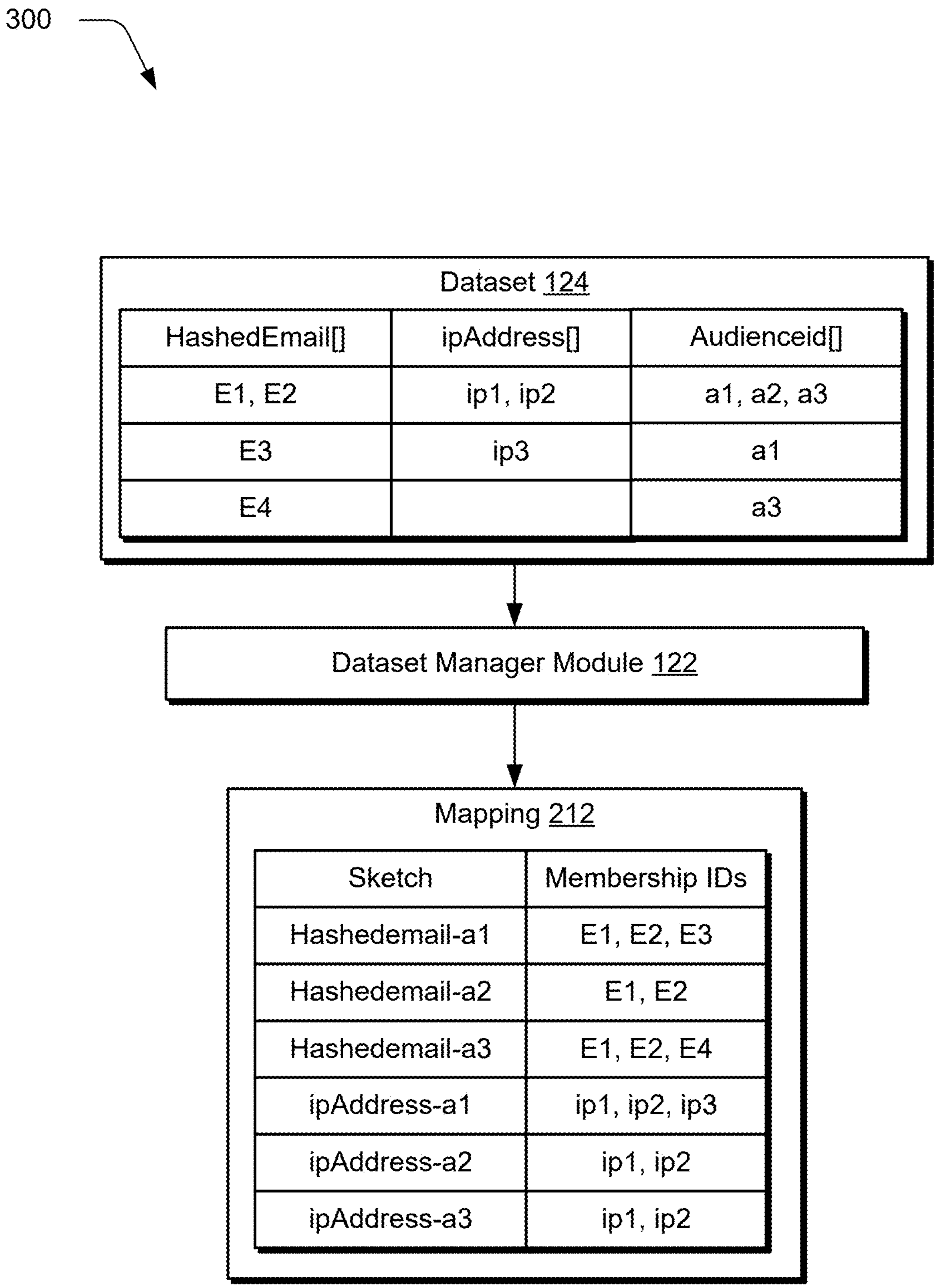
FIG. 3 depicts a system in an example implementation showing operation of a dataset manager module of FIG. 2 in greater detail as forming a sketch and corresponding mappings with respect to confidential information indicating which entities are associated with the sketches.

FIG. 3 depicts a system 300 in an example implementation showing operation of the dataset manager module 122 of FIG. 2 in greater detail as forming a sketch and corresponding mappings to confidential information indicating which entities are associated with the sketches. The dataset 124 includes three columns in this example, the "hashEmail[ ]" and "ipAddress[ ]" as examples of identity keys, while the "audienceid[ ]" column includes membership IDs, and values of respective attributes 132 included in respective columns. Therefore, audienceID[ ] "a1" is associated with hashedemails[ ] "E1, E2, E3." Likewise, a hashed email "E3" and a corresponding IP address "ip3" is associated with audience "a1."

In this example, the membership ID 206 is a simple string having a categorical value indicating membership of an audience with respective attributes in columns associated with respective identity keys. Therefore, the sketch and membes illustrated in the mapping 212 enumerate different combinations of hashed emails and IP addresses associated with respective audiences.

Representation of various probabilistic data structures are denotable using a hash, for example, in which the hashed email is used as an identity key for an audience to be indicated by the sketch. Therefore, each hashed email associated with audience "a1" is grouped and used to create a "clean" sketch representation for "a1." Membership IDs indicate "E1," "E2," and "E3" are members of the corresponding sketch, e.g., "hashEmail-a1" as illustrated. This process is also repeated for the IP addresses in the illustrated example.

In this way, the rows and columns are effectively pivoted into a sketch-based inverted index. The mapping 212 therefore provides a cross reference between the sketch and corresponding membership IDs that is usable to resolve which entities associated with respective membership IDs are associated with respective sketches 136 without exposing this relationship outside of the computing device 104.

FIG. 4 depicts a table 400 in an example implementation showing types of sketches generated for respective data types by a dataset manager module 122. As previously described, the dataset manager module 122 is configured to employ internal data structures as a guide to sketch generation. Therefore, the dataset manager module 122 is configurable to select from a plurality of internal data structures based a data type to be processed to form a respective sketch 136. In this way, the dataset manager module 122 is configurable to generate sketches 136 having a variety of configurations.

In a first example of a "categorical" data type, sketches are generated that support "membership querying," "cardinality estimators," and "similarity checks." For a second example of a "categorical number" data type, sketches are also generated that support "membership querying," "cardinality estimators," and "similarity checks." In a third example of "continuous valued" data type, sketches are generated that support "membership querying," "cardinality estimators," "similarity checks," "frequency estimators," and "rank estimators." In this way, the internal data structures act as a guide in sketch generation by the dataset manager module 122. A variety of other examples are also contemplated.

FIG. 5 depicts an example implementation 500 of a sketch generation methodology employed by a dataset manager module 122. For a simple scenario that does not involve dimensionality of the designated values, the following operations are performed by the dataset manager module 122, and more particularly the sketch generation module 210:

For each row in the dataset 124:
  For each audience "Ai" in audience list (A1, A2, . . . An);
    For Identity Type in [HashedEmail, ipAddress];
      Add each of the IDs of "IdentityType" in row to "Ai-identity type" sketch.

This results in the creation of sketches as variations of cardinality estimators, e.g., Theta Sketches, HyperLogLog, and Membership based sketches such as Bloom filters on an audience ID/identity type granularity. In this example, the audience ID maps to a categorical type.

FIG. 5 depicts an example implementation of sketch generation by a dataset manager module 122 that addresses dimensional values in a dataset 124. In a scenario involving dimensional values, in addition to the audience data, extra dimensional information is added to provide additional information. In the illustrated example, "Hashed Email" is associated with additional information including "age," "gender," and "preferences[ ]." Therefore, data types for "age" include "categorical number," for "gender" include "categorical," and for "preferences" include "categorical."

The granularity of sketches generated by the dataset manager module 122 is configurable as a combination of audience ID, identity type, dimension name, and dimension discretized value. The following operations are performed by the dataset manager module 122, and more particularly the sketch generation module 210:

For each row in the dataset 124:
  For each audience "Ai" in audience list (A1, A2, . . . An);
    For Identity Type in [HashedEmail, ipAddress];
      Add each of the IDs of "IdentityType" in row to "Ai-identity type dimension value" sketch.

In a scenario involving continuously valued data, the sketch generation module 210 preprocesses and discretizes the data in terms of percentiles "p0," "p10,", "p20," . . . "p90," "p100" where "p100" is a maximum value and "p0" is a minimum value. This permits the sketch generation module 210 to discretize the continuously valued attributes into buckets, i.e., "bucketize" the values of the attributes.

For a timeseries data type, the dataset 124 includes a timestamp column and corresponding data that is a subject of the timestamp. Therefore, each row of the dataset 124 may include the following:

Identity type, e.g., hashed email, IP address that generated the data;
Timestamp of the event;
Metric, e.g., sum of impressions;
Metric Value; and
Optional dimensional fields such as "adset," "adgroup," and so on.

The following operations are performed by the dataset manager module 122, and more particularly the sketch generation module 210 in a timeseries scenario:

For each row in the dataset 124:
  For each metric "Mi" in a metric list (M1, M2, . . . Mn);
    For Identity Type in [HashedEmail, ipAddress];
      For each dimension field:
        For distinct metric aggregation value:
        Add each of the IDs of Identity Type in row to date-hour-identitytype-metric-metric-value-dimension-value sketch.

The granularity of the sketches in this scenario supports queries such as "find a sum of each of the impression that occurred on 26 August Hour 2 for hashed emails" which would cause the database service 116 to return a corresponding sketch as a probabilistic result. Of note, the distinct value of the metric value is also encoded in the sketch in this example without sampling, which increases accuracy over conventional sampling based techniques.

Returning again to FIG. 2, the sketch 136 is then communicated for storage in a database having probabilistic data structures 120 that supports a probabilistic result to a query operation. The sketch 136 is configured to be stored independent of identification of the entity (block 610) within a database having probabilistic data structures 120. In this way, the confidential information 130 is not exposed outside of the dataset manager module 122 and the service provider system 102.

Figure 7:
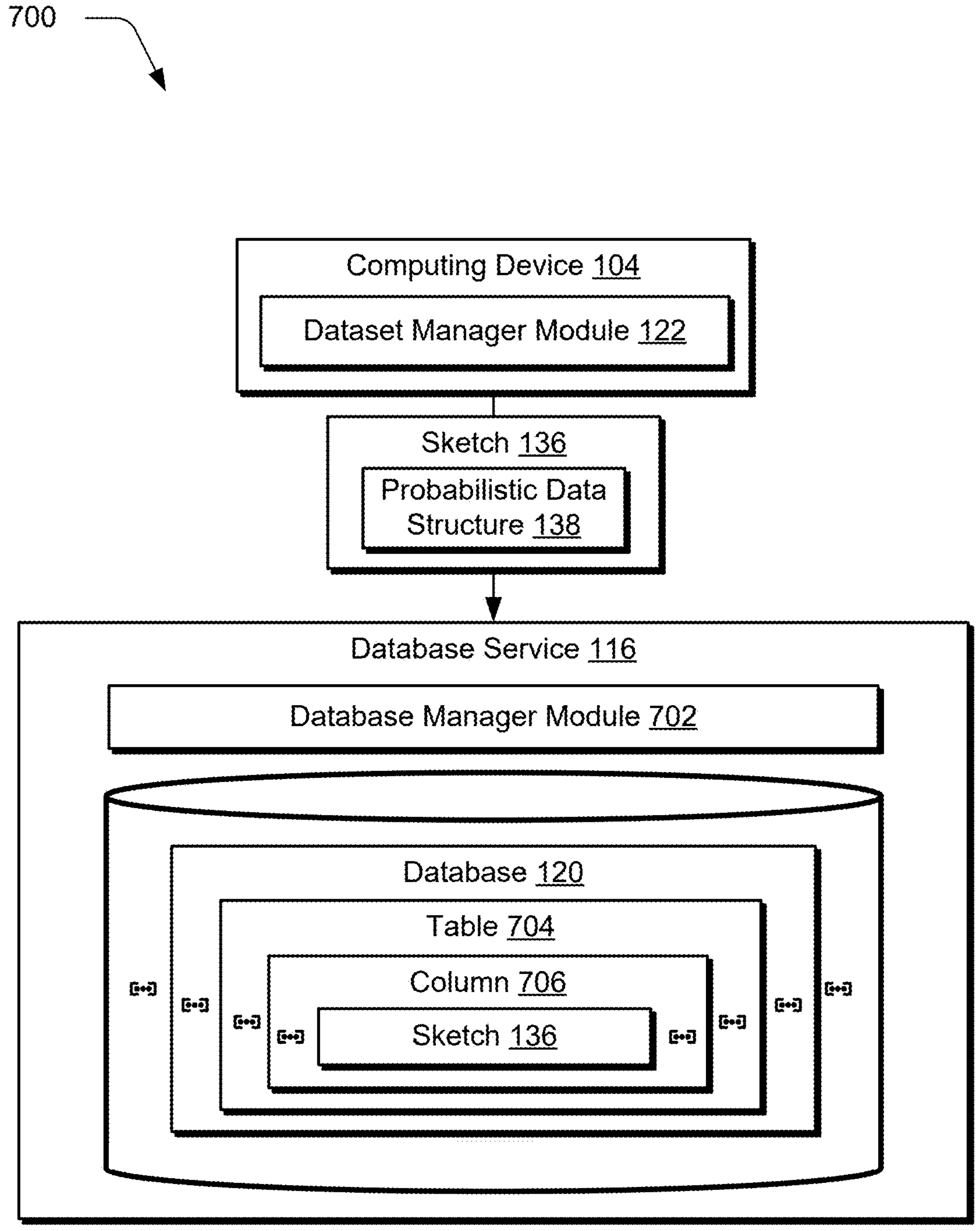
FIG. 7 depicts a system in an example implementation showing a database structure of a database having probabilistic data structures of FIG. 1 usable to maintain a sketch from a computing device without exposing confidential information.

FIG. 7 depicts a system 700 in an example implementation showing a database structure of the database having probabilistic data structures 120 usable to maintain a sketch 136 from a computing device 104 without exposing confidential information. The database service 116 includes a database manager module 702 configured to process queries and return probabilistic results to the queries using the sketches 136.

Each database service 116 includes one or more databases having probabilistic data structures 120, in which each database having probabilistic data structures 120 including one or more tables 704 having one or more columns 706 that are represented, respectively, using one or more sketches 136. This structure supports flexible creation of spaces for storing logically separated datasets and also supports schema definitions at a table/dataset level. The structures also support access controls. A schema of the tables 704 may be defined during design phase of the database having probabilistic data structures 120 or auto inferred during loading of a dataset 124 to the table 704 by the database manager module 702.

Conventionally, a relational database is based on a mathematic notion of a set and corresponding set operations. The database having probabilistic data structures 120 as described herein relies on a construction of a set using a sketch 136. A sketch 136, as previously described, is a probabilistic data structure that does not store individual dataset records 128 and thus does not record record-level identity, i.e., the membership ID or other confidential information. Although use of the sketch 136 and database having probabilistic data structures 120 has been described for use in data privacy management, these techniques are also applicable to generic datasets 124 as well.

Figure 8:
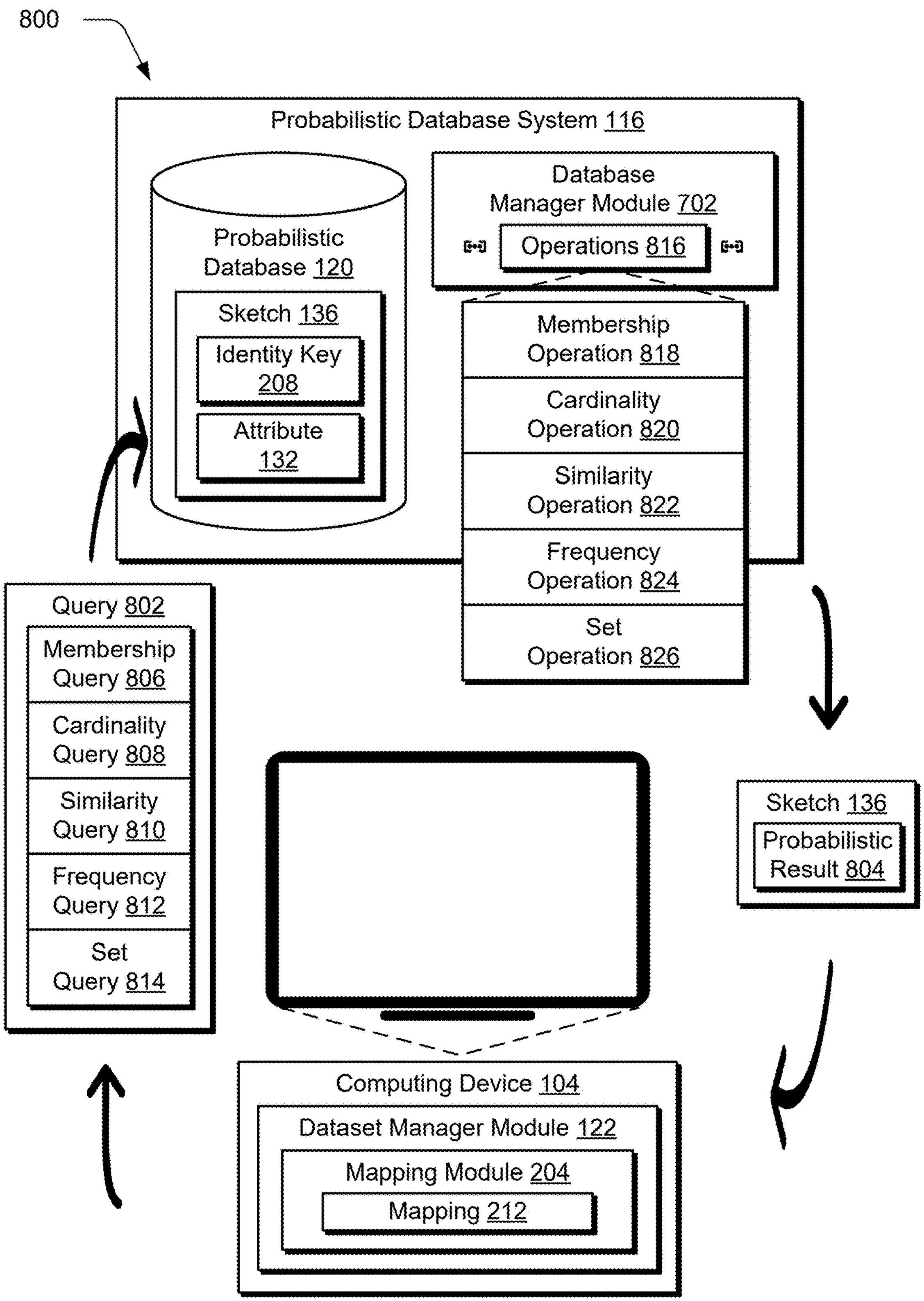
FIG. 8 depicts a system in an example implementation showing generation of a query by a computing device and generation of a probabilistic result as a response to the query by the database system.

FIG. 8 depicts a system 800 in an example implementation showing generation of a query by a computing device and generation of a probabilistic result as a response to the query by the database service 116. In this example, the dataset manager module 122 is employed by the computing device 104 to generate a query 802. The database manager module 702 of the database service 116 then processes the query 802 using the database having probabilistic data structures 120 to generate a response. The response in the illustrated example includes a sketch 136 having a probabilistic result 804 that is selected based on the query 802.

The query 802 is configurable in a variety of ways. In a first example, the query 802 is a membership query 806. The membership query 806 is usable to pose a question such as "is a particular ID present in a set?" e.g., using a Bloom filter as the probabilistic result 804. In a second example, the query 802 is configured as a cardinality query 808. A cardinality query 808 is usable to pose a question such as "How many IDs are present in a set?" with a probabilistic result 804 as a Theta Sketch, HyperLogLog, HyperLogLog++, and so on.

In a third example, the query 802 is configurable as a similarity query 810 structured to pose a question of "how similar are two sets?" A response to the query is formable using a MinHash as the probabilistic result 804. In a fourth example, the query 802 is configured as a frequency query 812 that is configured to pose a question such as "What is the frequency of occurrent of a particular event?" A response to the query is formable using a Count-Min sketch.

These queries support a variety of use cases. In a customer dataset example, the queries support materialization. For example, given a sketch and a list of identities, materialize a sketch as a set of identities that represent an audience corresponding to the sketch. To do so, the database manager module 702 performs repeated membership lookups and queries against the sketch.

In another example, an estimate of the cardinality of an audience set size is queried, in which the audience is represented using a corresponding sketch 136. In a further example, given two audiences (e.g., audience "A" and audience "B"), each as a respective sketch 136, build a new audience as a union of these two audiences, represented as a respective sketch 136. In yet another example, a look-alike model is built of a seed audience based on a sketch 136. For frequency and reach, reach and frequency to a desired audience are estimated from advertising logs. A variety of other examples are also contemplated, such as a set query 814 usable to specify a respective set operation such as "union," "intersect," and so forth.

The database manager module 702, therefore, is configurable to perform a variety of operations 816 based on the types of queries received. Illustrated examples of which include a membership operation 818, cardinality operation 820, similarity operation 822, frequency operation 824, set operation 826, and so on. Examples of operations and corresponding outputs include:

isPresent(string element)→Boolean;
union(sketch)→sketch;
intersect(sketch)→sketch;
getEstimatedCardinality→long;
similarityScore(sketch)→double; and
aNotb(sketch)→sketch.

The above examples include instances in which operations involve two or more sketches to generate a new sketch, e.g., union and intersect, a-not-b, and so forth.

A union operation, as an example of a set operation 826, may be performed by the database manager module 702 as a lossless operation through use of a sketch 136. Each of the components represented by the sketches 136, for instance, are added together to produce a lossless version of a net sketch, e.g., through use of Bloom filters, Theta sketches, and so forth.

An intersect operation, on the other hand, may be "lossy." Theta sketches support a native intersect operation, for instance, which is usable to produce a new effective Theta sketch but may include additional error over any predecessors. A native intersect operation does not exist for a Bloom filter. Therefore, a deferred evaluation is performed through use of deferred execution to create a reference to an intersect operation and which Bloom filters are involved in that operation. When such a reference exists, deferred execution is performed by the database manager module 702, e.g., during a "isPresent" check on a sketch 136.

When an actual computation is performed as part of deferred execution, a truth table may be created with execution results, e.g., "isPresent" checks for each entry. In this way, deferred execution is usable to support operations not natively supported by particular types of probabilistic data structures through reference to respective sketches which are then performed at a later point in time, which is not possible in conventional techniques.

Figure 9:
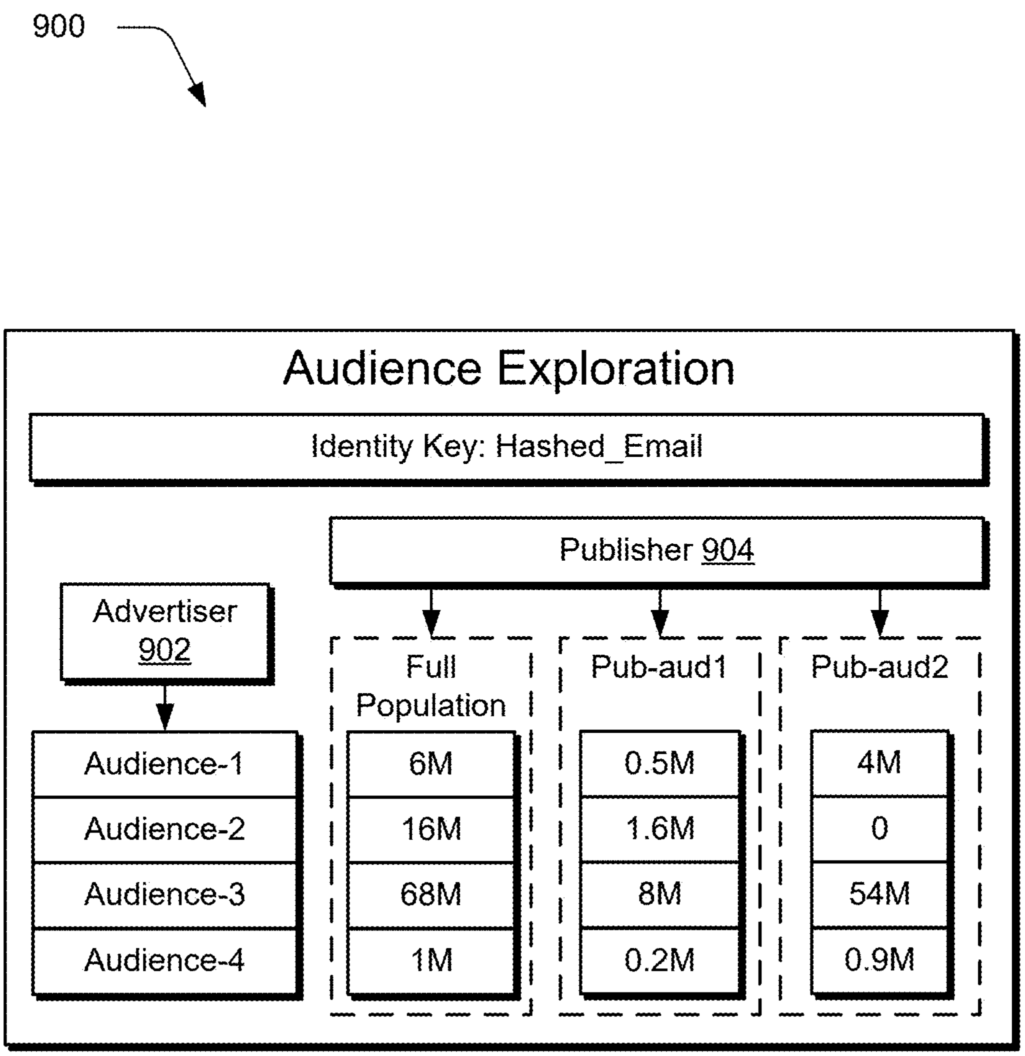
FIG. 9 depicts an example implementation involving audience exploration to determine audience overlaps between an advertiser and a publisher.

FIG. 9 depicts an example implementation 900 involving audience exploration to determine audience overlaps between an advertiser and a publisher. The identity key in this example is "hashed_email" and is based on a comparison of sketches generated, respectively, from datasets of an advertiser 902 and a publisher 904. The advertiser 902 audience (e.g., "a1," "a2," "a3," "a4") is indexed as a sketch 136 "sketch(a(i))" into a database having probabilistic data structures 120. A publisher 904 audience (e.g., "p1," "p2," "p3," "p4"), likewise, is indexed into a sketch and stored in the database having probabilistic data structures 120 as "sketch(p(j))."

In order to compute an overlap of these audiences, a cross product of two arrays of sketches is computed as follows:

```
let identity key=email;
for audience-sketch in [audience1-email-cleanSketch,
    audience2-email-Sketch, . . . ]:
    for publisher-sketch in [publisher-email-fullPopulationSketch, pub-aud1-email-Sketch . . . ]
        audience-sketch.getThetaSketch.intersect(publisher-sketch.getThetaSketch)
```

Thus, in this example, a Theta sketch is retrieved from an audience sketch and a publisher sketch to perform the intersection.

In another example involving materialization, the following timeline of events has occurred:

t1—Advertiser uploaded audience-a4 with hashed emails as a match key;

t2—Advertiser compared a4 with other publisher audiences and chose a4 for activation using the same hashed email identity key; and t3—Advertiser materialized a temporary audience temp-audience based off audience-a4.

Audience "a4" is then chosen for materialization by the publisher 904. To do so, the dataset manager module 122 retrieves a sketch 136 associated with the audience for identity key "hashed-email" from the database having probabilistic data structures 120. The dataset manager module 122 then accesses a corresponding probabilistic data structure 138 (e.g., Bloom filter) to generate and iterate through a list of each of the identifiers associated with the publisher 904. If "isPresent" is "yes" then it is added to a temporary activation list that contains the IDs and is sent to the publisher 904. A variety of other examples are also contemplated.

FIG. 10 is a flow diagram depicting an algorithm 1000 as a step-by-step procedure in an example implementation of operations performable for accomplishing a result of query processing using a probabilistic database. A query is received for processing by a probabilistic database (block 1002). A probabilistic result is then generated by processing the query using the probabilistic database based on a corresponding operation. The probabilistic database includes a plurality of sketches, each sketch configured as a probabilistic data structure having a column that maintains a respective attribute associated with a respective entity of a plurality of entities (block 1004). The probabilistic result is then presented for output in a user interface (block 1006).

FIG. 11 is a flow diagram depicting an algorithm 1100 as a step-by-step procedure in an example implementation of operations performable for accomplishing a result of sketch generation based on groupings of dataset records. To begin in this example, a structured dataset is received. The structured dataset includes a plurality of dataset records that include a respective identity key of a plurality of identity keys, a plurality of attributes associated, respectively, with the plurality of identity keys. A plurality of membership identifiers are also associated with respective attributes (block 1102).

A plurality of dataset groups are then formed by grouping the dataset records based on correspondence with membership identifiers of the plurality of membership identifiers (block 1104). A plurality of sketches are generated, respectively, based on the plurality of dataset groups, each sketch configured as a probabilistic data structure based on one or more identity keys and one or more said attributes of the plurality of dataset records associated with a respective said group (block 1106). The plurality of sketches are stored in a probabilistic database that supports a probabilistic result to a query (block 1108).

Figure 12:
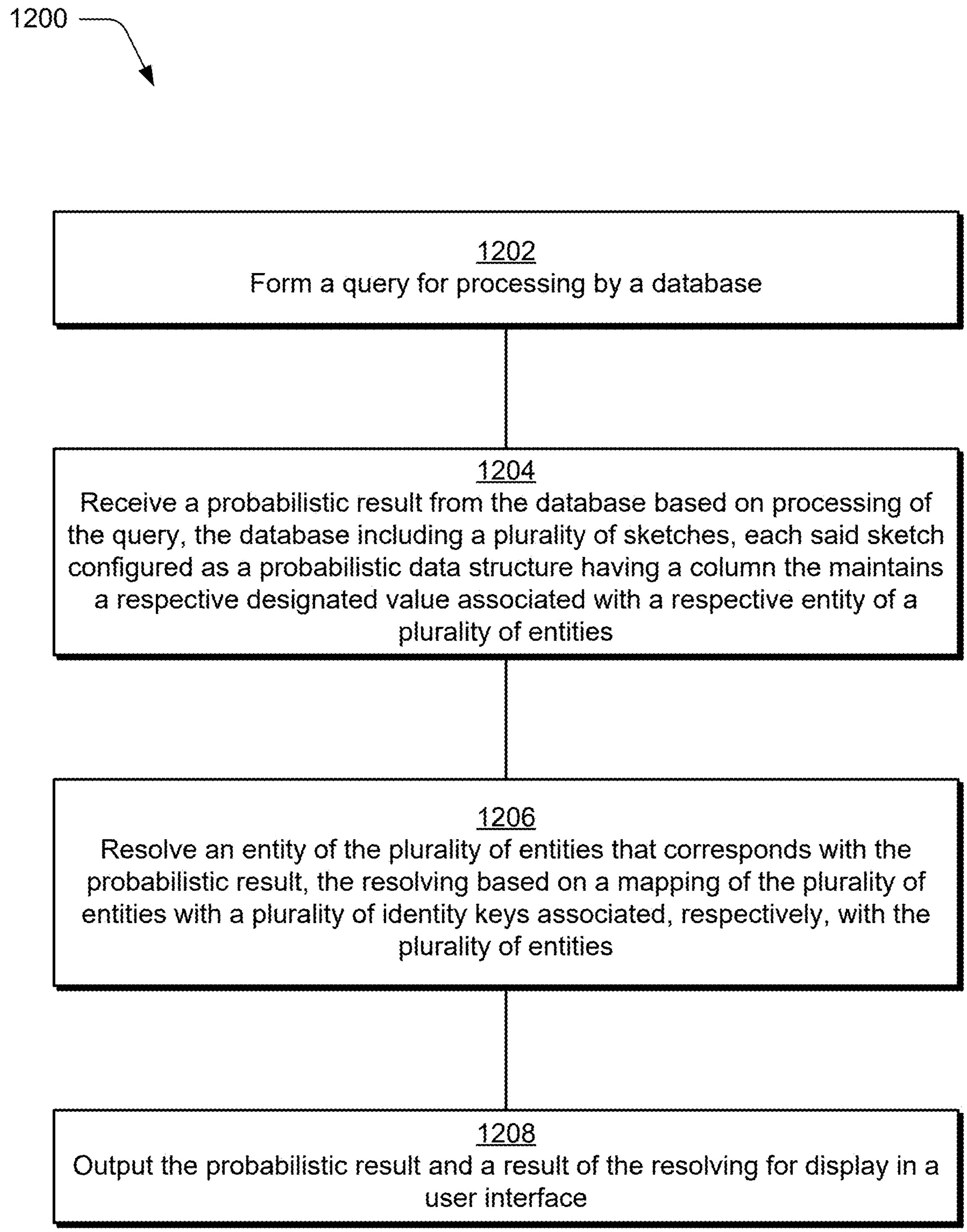
FIG. 12 is a flow diagram depicting an algorithm as a step-by-step procedure in an example implementation of operations performable for accomplishing a result of resolving an entity as corresponding to a probabilistic result received in response to a query.

FIG. 12 is a flow diagram depicting an algorithm 1200 as a step-by-step procedure in an example implementation of operations performable for accomplishing a result of resolving an entity as corresponding to a probabilistic result received in response to a query. A query is formed for processing by a probabilistic database (block 1202). A probabilistic result is received from the probabilistic database based on processing of the query. The probabilistic database includes a plurality of sketches, each sketch configured as a probabilistic data structure (block 1204). An entity of a plurality of entities (e.g., members) that corresponds with the probabilistic result. The resolving is based on a mapping of the plurality of entities with the plurality of sketches (block 1206). The probabilistic result and a result of the resolving for display in a user interface (block 1208), e.g., a display of the entity associated with an answer to the query.

FIG. 13 is a flow diagram depicting an algorithm 1300 as a step-by-step procedure in an example implementation of operations performable for accomplishing a result of sketch generation based on dataset groups formed for respective audiences of users. A structured dataset is received having confidential information. The confidential information is included in a plurality of dataset records that correspond, respectively, to a plurality of audiences (block 1302).

A plurality of dataset groups are formed by grouping the dataset records based on correspondence with respective audiences of the plurality of audiences (block 1304). A plurality of sketches are generated, respectively, based on the plurality of dataset groups. Each sketch is configured as a probabilistic data structure that does not include the confidential information (block 1306). A mapping is then stored of the confidential information that cross references the plurality the plurality of sketches with the plurality of audiences (block 1308). The plurality of sketches are also communicated to be stored in a probabilistic database that supports a probabilistic result to a query operation without exposing the plurality of audiences (block 1310).

Example System and Device

Figure 14:
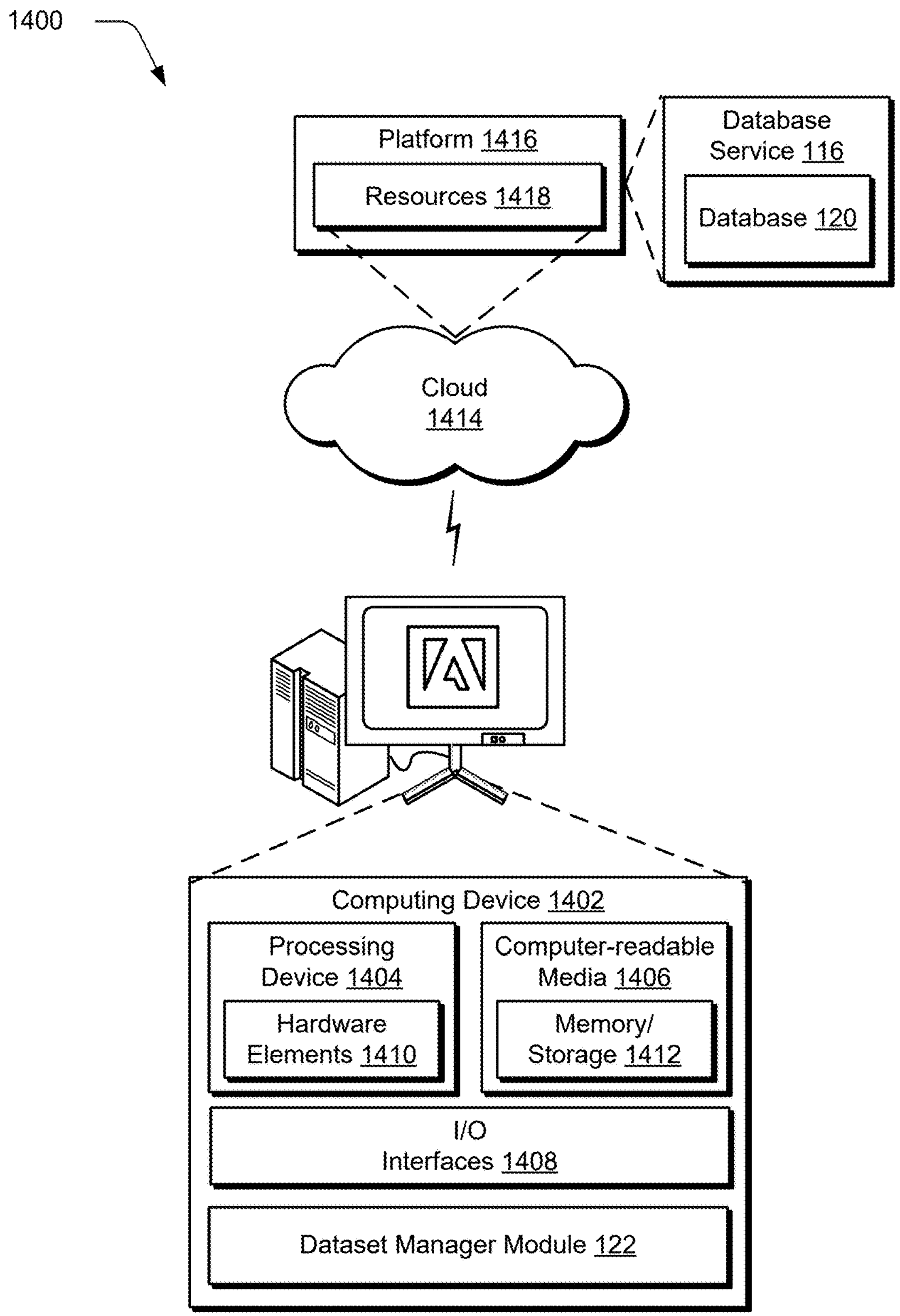
FIG. 14 illustrates an example system including various components of an example device that can be implemented as any type of computing device as described and/or utilize with reference to the previous figures to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the database service 116, the database having probabilistic data structures 120, and the dataset manager module 122. The computing device 1402 is configurable, for example, as a server of a service provider, a device associated with a client (e.g., a client device), an on-chip system, and/or any other suitable computing device or computing system.

The example computing device 1402 as illustrated includes a processing device 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1404 is representative of functionality to perform one or more operations using hardware. Accordingly, the processing device 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412 that stores instructions that are executable to cause the processing device 1404 to perform operations. The computer-readable storage medium is configured for storing instructions that, responsive to execution by the processing device, causes the processing device to perform operations. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing device 1404. The instructions and/or functions are executable/operable by one or more articles of manufacture (for example, one or more computing devices 1402 and/or processing devices 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

In implementations, the platform 1416 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method executed by a processing device configured for privacy-query operation, the method comprising:

receiving, by the processing device, a query for processing by a database;

generating, by the processing device, a probabilistic result by processing the query using the database based on a corresponding operation, the database including a plurality of sketches, each said sketch configured as a probabilistic data structure having a column that maintains a respective attribute associated with a respective entity of a plurality of entities, the plurality of entities are associated, respectively, with a plurality of membership identifiers having confidential information and the database stores the plurality of sketches independent of the plurality of membership identifiers, such that recovery of the confidential information from the sketches is prevented; and presenting, by the processing device, the probabilistic result for output in a user interface.

2. The method as described in claim 1, wherein the plurality of entities are associated, respectively, with the plurality of membership identifiers and the plurality of columns are associated, respectively, with a plurality of identity keys.

3. The method as described in claim 1, wherein the sketch, as stored in the database, does not support direct identification of the plurality of entities via the database.

4. The method as described in claim 1, wherein the sketch is stored independent of row-level data associated with confidential information.

5. The method as described in claim 1, wherein the database includes one or more tables, each said table having one or more columns that are represented, respectively, using a respective said sketch.

6. The method as described in claim 1, wherein the probabilistic result is configured to be resolved, via a mapping, to a respective said entity of the plurality of entities, the mapping indicating correspondence of a respective said sketch included in the probabilistic result to the respective said entity.

7. The method as described in claim 1, wherein the probabilistic data structure is a Bloom filter, Theta Sketch, or MinHash.

8. The method as described in claim 1, wherein the query is a membership query, cardinality query, a similarity query, or a frequency query.

9. The method as described in claim 1, wherein the corresponding operation is a set operation.

10. A system comprising:

a processing device; and a computer-readable storage medium storing instructions that, responsive to execution by the processing device, causes the processing device to perform privacy-preserving query operations including:

forming a query for processing by a database;

receiving a probabilistic result from the database based on processing of the query, the database including a plurality of sketches, each said sketch configured as a probabilistic data structure;

resolving an entity of a plurality of entities that corresponds with the probabilistic result, the resolving based on a mapping of the plurality of entities with the plurality of sketches, the plurality of entities are associated, respectively, with a plurality of membership identifiers having confidential information and the database stores the plurality of sketches independent of the plurality of membership identifiers, such that recovery of the confidential information from the sketches is prevented; and outputting the probabilistic result and a result of the resolving for display in a user interface.

11. The system as described in claim 10, wherein the query is a membership query, cardinality query, a similarity query, or a frequency query.

12. The system as described in claim 10, wherein the query is a set operation.

13. The system as described in claim 12, wherein the set operation is a union operation or an intersect operation.

14. One or more computer-readable storage media storing instructions that, responsive to execution by a processing device, causes a processing device to perform privacy-preserving query operations comprising:

receiving a structured dataset having confidential information, the confidential information included in a plurality of dataset records that correspond, respectively, to a plurality of audiences;

forming a plurality of dataset groups by grouping the dataset records based on correspondence with respective audiences of the plurality of audiences;

generating a plurality of sketches, respectively, based on the plurality of dataset groups, each said sketch configured as a probabilistic data structure that does not include the confidential information, such that recovery of the confidential information from the sketches is prevented;

storing a mapping of the confidential information that cross references the plurality the plurality of sketches with the plurality of audiences;

communicating the plurality of sketches to be stored in a database that supports a probabilistic result to a query operation without exposing the plurality of audiences;

forming a query for processing by the database;

receiving the probabilistic result to the query from the database; and resolving at least one said audience associated with the probabilistic result based on the mapping.

15. The one or more computer-readable storage media as described in claim 14, wherein the plurality of sketches is stored independent of row-level data of the structured dataset and do not support direct identification of the plurality of audiences via the database.

16. The one or more computer-readable storage media as described in claim 14, wherein the database includes one or more tables, each said table having one or more columns that are represented, respectively, using a respective said sketch.

17. The one or more computer-readable storage media as described in claim 14, wherein the structured dataset includes a plurality of identity keys identifying a respective item of digital content of a plurality of items of digital content.

18. The one or more computer-readable storage media as described in claim 14, wherein the generating of the sketch is performed without sampling.

19. The method as described in claim 9, wherein the set operation is a union operation or an intersect operation.

20. The system as described in claim 10, wherein the plurality of sketches, as stored in the database, do not support direct identification of the plurality of membership identifiers via the database.

* * * * *